United States Patent [19]
Hashizume

[11] Patent Number: 4,498,456
[45] Date of Patent: Feb. 12, 1985

[54] SELF-TRACKING MECHANISMS FOR SOLAR COLLECTORS
[75] Inventor: Kenichi Hashizume, Tokyo, Japan
[73] Assignee: Tokyo Shibaura Denki Kabushika Kaisha, Kawasaki, Japan
[21] Appl. No.: 564,679
[22] Filed: Dec. 23, 1983
[30] Foreign Application Priority Data
  Dec. 27, 1982 [JP] Japan ................ 57-232325
[51] Int. Cl.³ ............................. F24J 3/02
[52] U.S. Cl. ................... 126/425; 126/438
[58] Field of Search ........... 126/424, 425, 438, 439, 126/451

[56] References Cited
U.S. PATENT DOCUMENTS

| 1,951,404 | 3/1934 | Goddard | 126/425 |
| 3,982,526 | 9/1976 | Barak | 126/425 |
| 4,044,752 | 8/1977 | Barak | 126/425 |
| 4,304,221 | 12/1981 | Trihey | 126/424 X |
| 4,351,319 | 9/1982 | Robbins, Jr. | 126/424 X |
| 4,365,616 | 12/1982 | Vandenberg | 126/424 |

FOREIGN PATENT DOCUMENTS 2842084 5/1980 Fed. Rep. of Germany.
1566797 5/1980 United Kingdom.

Primary Examiner—Larry Jones
Attorney, Agent, or Firm—Schwartz, Jeffery, Schwaab, Mack, Blumenthal & Koch

[57] ABSTRACT

A self-tracking mechanism for a solar collector comprises a plurality of sensor concentrators arranged side by side and a plurality of shape memory alloy coils each located at a position coincident with the focal line of the corresponding one of sensor concentrators. The shape memory alloy coil is treated so as to shrink into a memorized shape when heated. Each of a plurality of tension wires have one end connected to one end of the shape memory alloy coil and the other end wound up on a wire drum which is mounted on a drive shaft. A transfer mechanism is operatively connected to the drive shaft for transferring the rotation of the drive shaft to a rotatable main collector.

20 Claims, 9 Drawing Figures

SELF-TRACKING MECHANISMS FOR SOLAR COLLECTORS

BACKGROUND OF THE INVENTION

This invention relates to a self-tracking mechanism for a solar collector for tracking the movement of the sun with time to effectively collect radiant energy from the sun.

Recently, it has been required to develop a tracking technology for solar collectors of concentration type for effectively collecting radiant energy from the sun and getting a high temperature for use in various technical fields. For these purposes, various tracking systems for solar collectors each utilizing a driving motor and electronic control devices therefor were developed or proposed. However, these tracking systems require an electric power supply and are somewhat complicated for technology transfer to developing countries where sunshine is so abundant that the utilization of solar energy is favorable while networks of electric power supply have not yet been developed. Taking the above facts into consideration, some tracking mechanisms for solar collectors were proposed in, for example, U.S. Pat. Nos. 3,982,526, 4,044,752, and 4,365,616 which require no electric power supply and no electronic control devices for simplifying their mechanisms.

Each of the former two U.S. Patents discloses a device which is provided for turning a solar collector about either a polar axis or an east-west horizontal axis. The device includes heat responsive elements which exert forces when they are heated by the radiant energy from the sun and become limp when shaded. When the heat responsive element is heated by the solar energy within a certain range of the azimuth or altitude angle, the solar collector can be rotated to a position to face the position of the sun. The latter one U.S. Patent also discloses a device which is provided for turning a parabolic trough solar collector about an east-west horizontal axis and the alignment of the solar collector is accomplished by the heating of a long wire held in tension by a spring.

These ideas in prior patents, however, cannot always satisfy our requirement for tracking mechanisms of the solar collectors for the reason that the tracking mechanisms of the former two patents can carry out its position change to only two, three in maximum, positions of the movement of the sun with time. The latter one patent cannot track the sun after the sun has been covered with clouds for a certain time period, and for the same reason, the tracking of the sun about the north-south axis cannot be realized. Furthermore the application of this mechanism is limited to solar collectors with a parabolic trough reflector. These defects or disadvantages of the tracking mechanisms, disclosed in the prior patents will be understood by those skilled in the art from the disclosures of these patents.

SUMMARY OF THE INVENTION

An object of this invention is to provide a solar tracking mechanism with no electric power supply and no electronic control devices.

Another object of this invention is to provide a solar tracking mechanism for a solar collector capable of catching the position of the sun moving with time in an arbitrary number of positions by side-by-side arrangement of a plurality of sensor concentrators.

A further object of this invention is to provide a solar tracking mechanism for a solar collector capable of tracking the sun, even if the sun disappears for a certain time period, when the sun again appears.

According to this invention, there is provided a solar collector of the type comprising a base, a frame secured to the base, a main reflector rotatably attached to the frame, and a solar tracking mechanism, and the solar tracking mechanism comprises a plurality of sensor parabolic trough reflectors arranged side by side and fixed to the frame with different angles respectively, shape memory alloy coils each having one end connected to the frame and located at a position coincident with the focal line of the corresponding one of sensor parabolic trough reflectors, the shape memory alloy coils being treated so as to shrink into a memorized tightly wound-up coil shape when heated to a predetermined temperature, tension wires each having one end connected to the other free end of the shape memory alloy coil, wire drums provided with a common drive shaft and each fixing the other end of the tension wire for winding up or off the tension wire, and a transfer mechanism operatively connected to the drive shaft for transferring the rotation of the drive shaft to the main parabolic trough reflector.

DESCRIPTION OF THE PREFERRED EMBODIMENTS

Figure 1:
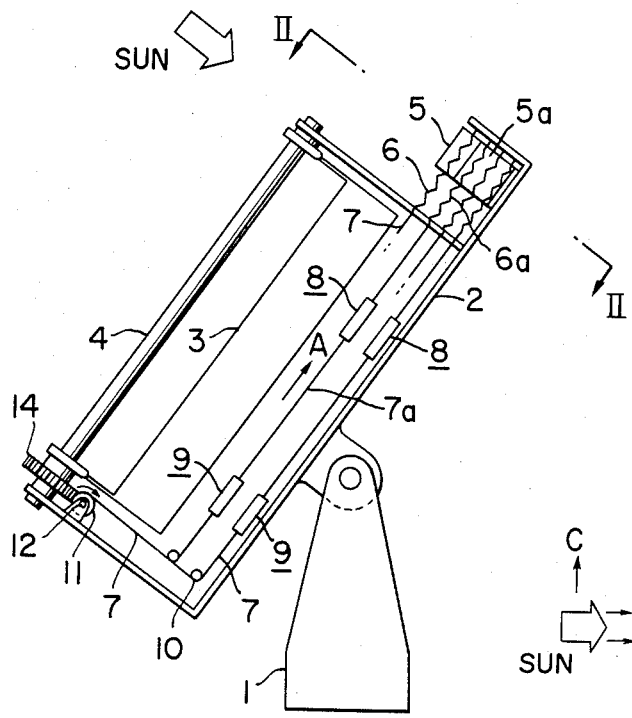
FIG. 1 shows a schematic side view of a solar collector provided with a self-tracking mechanism according to this invention.

Referring to FIG. 1 which shows a schematic side view of a solar collector provided with a self-tracking mechanism according to this invention, a frame 2 is secured to a support base 1 which is generally settled on the ground and a main parabolic trough reflector 3 is rotatably attached to the frame 2. A heat collecting tube 4, through which heat transfer medium flows, is arranged at a position coincident with the focal line of the rotatable main parabolic trough reflector 3 and the axis of the heat collecting tube 4 extends in the north-south axis direction and is tilted to the latitude angle.

Figure 2A:
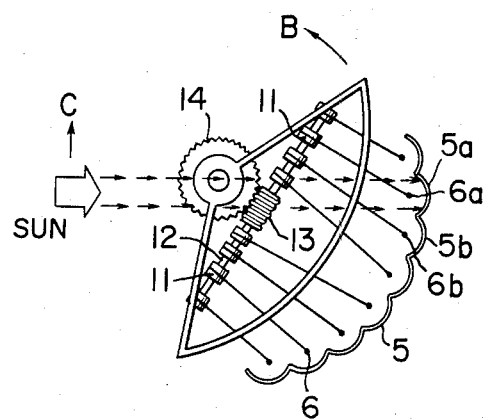
FIG. 2A shows a schematic cross-sectional view taken along the line II—II in FIG. 1.

A plurality of sensor reflectors 5 (5a, 5b, . . . ) are secured to the upper portion of the frame 2 with different angles respectively as shown in FIG. 2A so as to catch the positions of the movement of sun with time. A shape memory alloy (SMA) coil 6 (6a, 6b, . . . ) has a length corresponding to from 1 to 1.5 times of the length of the sensor reflector 5. The SMA coil 6 is arranged so as to coincide with the focal line of the parabolic trough reflector 5 and is covered with a glass tube, not shown. The SMA coil 6 is treated so that it shrinks into a tightly wound-up coil shape when it is heated to a predetermined temperature and Ni-Ti alloy wire is preferably used for SMA coil 6. One end of the SMA coil 6 is fixed to the upper portion of the frame 2 and connected at the other end to a tension wire 7 (7a, 7b, ...), which is wound up on a wire drum 11 via a slider mechanism 8, a mechanism 9 for absorbing slack of the tension wire 7, and an intermediate pulley 10. The rotation of each of the wire drums 11 caused by the tension wire 7 is transferred to the rotary shaft of the main parabolic trough reflector 3 through a worm gear 13 mounted on a common drive shaft 12 of the wire drums 11 and a worm wheel 14 secured to the drive shaft 12 and engaged with the worm gear 13 to thereby finally rotate the parabolic trough reflector 3.

A plurality of sensor parabolic trough reflectors 5 are arranged, as shown in FIG. 2A, side by side. The main and sensor parabolic trough reflectors 3 and 5 are made of a stainless steel on which aluminum is deposited and weather-proof coated, or of glass mirror.

Figure 2B:
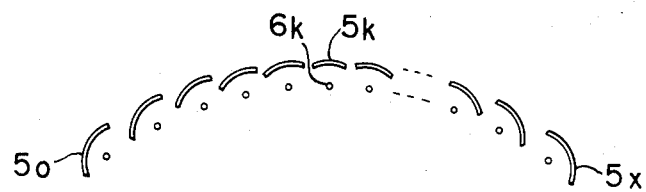
FIGS. 2B and 2C show examples showing arrangements of sensor concentrators according to this invention.
Figure 2C:
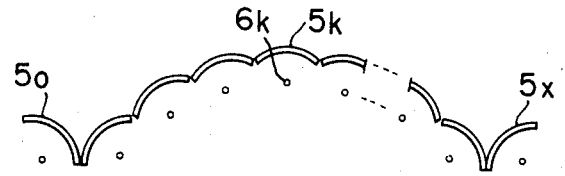

Although all of the sensor parabolic trough reflectors 5 (5a, 5b, ...) generally exhibit the same shapes or sizes, they can be constructed as shown in FIGS. 2B and 2C for effectively heating the SMA coils or for compactness. In FIG. 2B, is shown one example in which sensor parabolic trough reflectors 5 have widths gradually increasing from the central one 5k towards the outermost ones 5x and 5o. In FIG. 2C, is also shown another example in which the outermost sensor parabolic trough reflectors 5x and 5o are arranged at largely different angles outwardly.

Figure 4:
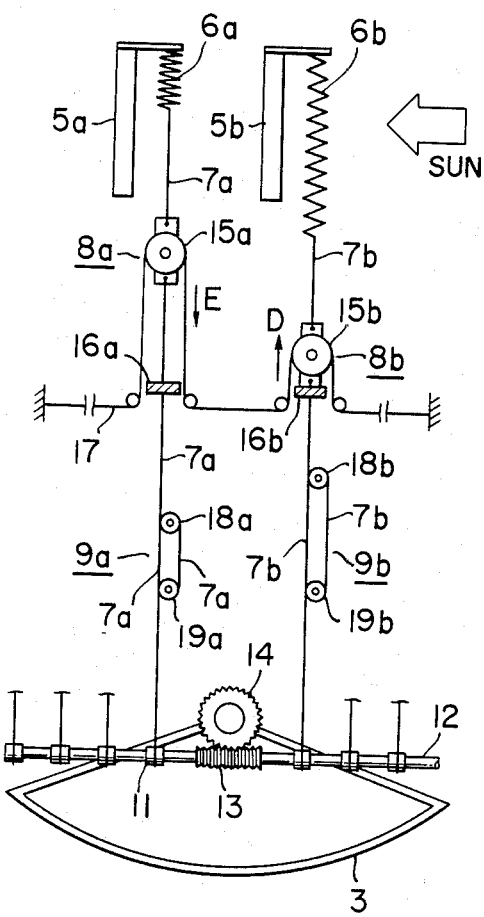
FIG. 4 is a schematic view shown for explaining the operation of the self-tracking mechanism shown in FIG. 1.

FIG. 4 is described for explaining the operation of the self-tracking mechanism for a solar collector shown in FIG. 1 according to this invention, in which adjacent two sensor reflectors 5a and 5b are illustrated in connection with their drive mechanisms to operate the main rotatable parabolic trough reflector 3. The slider mechanism 8 (8a, 8b, ...) comprises a movable pulley 15 (15a, 15b, ...), a stopping member 16 (16a, 16b, ...), and a wire 17 which is engaged with all pulleys 15a, 15b, ... to operatively connect the all pulleys and is attached to the frame 2 so that a pulley, for example 15a in FIG. 4, which is now lifted upwardly by the shrinkage of the SMA coil 6a, is lowered by upwardly lifting the pulley 15b when the radiant energy from the sun is directed from the sensor parabolic trough reflector 5a to the adjacent one 5b, and the SMA coil 6b shrinks.

The slack absorbing mechanism 9 (9a, 9b, ...) is constructed in combination of a plurality of, at least one, movable and stationary pulleys 18 (18a, 18b, ...) and 19 (19a, 19b, ...) and respective only one pulley 18a and pulley 19a are shown for convenience sake. A tension wire 7 (7a, 7b, ...) typically made of a stainless steel is engaged with the pulleys 18 and 19 to compensate for the slack of the tension wire 7.

Figure 3A:
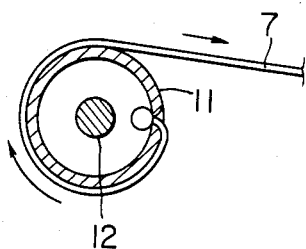
FIGS. 3A and 3B show winding-off and wound-off conditions of a tension wire on a wire drum, respectively.
Figure 3B:
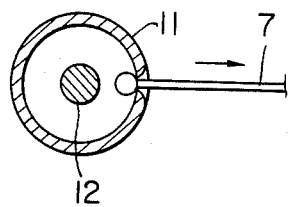

Supposing that the solar energy were now directed as shown by arrows in FIG. 2, the solar energy is collected by the sensor parabolic trough reflector 5a and concentrated on its focal line at which the SMA coil 6a is positioned. The SMA coil 6a is then heated and shrinks in the preliminarily memorized shape of a tightly wound-up coil form and the tension wire 7a connected to the SMA coil 6a is pulled in an arrowed direction A as shown in FIG. 1. Then, the tension wire 7a wound up on the wire drum 11a is wound off to thereby rotate the drive shaft 12 and finally rotate the main parabolic trough reflector 3 in an arrowed direction B, in FIG. 2, through the engagement of the worm gear 13 and the worm wheel 14. Since thhe tension wire 7 is wound up on the wire drum 11 in a manner as shown in FIG. 3A, the winding-off operation is completed when the wire drum 11 is rotated to the condition as shown in FIG. 3B and the rotation of the drive shaft 12 then stops. This fixes the maximum excursion of the main parabolic trough reflector 3.

When the sun moves in a direction C as shown in FIG. 2, the radiant energy from the sun is directed from the sensor parabolic trough reflector 5a to the adjacent sensor parabolic trough reflector 5b and concentrated on its focal line at which the SMA wire 6b is positioned. At this time, the shrunk SMA coil 6a maintains its shrunk condition, but loses its shrinking force because of the cooling-down due to the natural heat radiation to the ambient temperature. When the SMA coil 6b is heated and begins to shrink to its memorized shape, the tension wire 7b connected to the SMA coil 6b is pulled upwardly and the pulley 15b is also pulled upwardly as shown by an arrow D. The upward movement of the pulley 15b lowers the pulley 15a as shown by an arrow E because these pulleys 15a and 15b are operatively connected through the wire 17 having both ends secured to the frame 2, and at the same time, the SMA coil 6a provided with the shrinking force lost is expanded in the arrowed direction E. In this manner, the main parabolic trough reflector 3 is rotated so as to directly face the sun from the former position corresponding to the parabolic trough reflector 5a by the same manner as described above with respect to the sensor parabolic trough reflector 5a.

In order to prevent slacking of other tension wires when the tension wire 7b is wound off from the wire drum 11, the slack absorbing mechanism 9a is provided, in which the movable pulley 18a moves in a direction apart from the stationary pulley 15b thereby to absorb the slack of the tension wire 7a which is engaged with the pulleys 18a and 19b.

Figure 5:
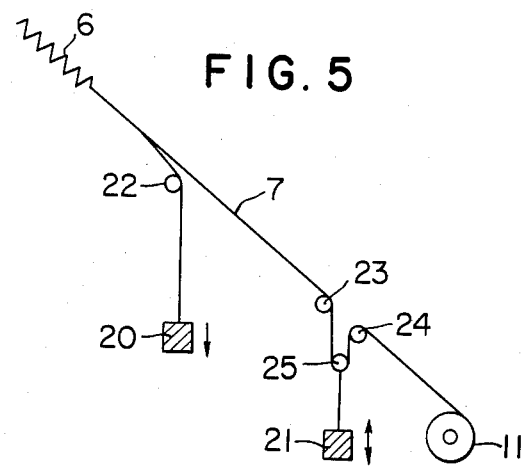
FIG. 5 shows an example of a slack absorbing mechanism to be assembled in the self-tracking mechanism shown in FIG. 4.

FIG. 5 shows another example of the slack absorbing mechanism 9 with an alternative of the slider mechanism, in which the tension wire 7 is connected to the SMA coil 6 at one end and to the wire drum 11 at the other end via stationary pulleys 22, 23 and 24 and a movable pulley 25. The tension wire 7 is tension-controlled by weight 21 to absorb the slack of the wire 7. In this example, the slider mechanism is replaced by weight 20 via pulley 22 for expanding the cooled-down SMA coil.

Figure 6:
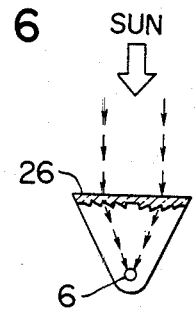
FIG. 6 is another example of a sensor concentrator.

FIG. 6 shows another example of the sensor concentrator, in which a linear Fresnel lens 26 is used to concentrate the solar beam to the SMA coil 6.

In the foregoing description of the embodiment, a parabolic trough reflector is used for a main solar collector, but a self-tracking mechanism for a solar collector according to this invention can be applicable to a solar collector provided with a flat plate collector or solar cell panels as a main collector.

The heat transfer medium such as heat transfer oil or pressurized hot water flowing continuously through the heat collecting tube 4 is continuously heated as far as the sun appears to obtain a higher temperature of about 150°–300° C., which is utilized for various technical processes or fields after carrying out the effective heat exchanging operation.

As described hereinabove, the collector 3 can track the sun and catch the radiant energy from the sun moving with time and even if the sun is covered with clouds for a certain time interval or disappears at night, the tracking mechanism for the solar collector according to this invention can operate immediately at a time when the sun again appears at any position. It will be of course understood that the north-south axis east-west tracking and east-west axis altitude tracking can be realized.

I claim:

1. A solar tracking mechanism comprising:
   a frame;
   a main collector attached to said frame;
   a plurality of elements each made out of a shape memory alloy and each contracting to a memorized shape when the temperature of said element is above a predetermined temperature;
   means for concentrating solar energy on said plurality of elements;
   stretching means for applying a stretching force to each of said elements to permit each element to contract when said element is heated past said predetermined temperature and to stretch each element when said element is not heated past said predetermined temperature; and
   means associated with said main collector and said stretching means, for transmitting mechanical motion caused by the stretching and contracting of said element to said main collector to rotate said main collector.

2. A mechanism as claimed in claim 1 wherein the memorized shape of each of a said elements is a tightly wound coil.

3. A mechanism as claimed in claim 1 wherein said solar energy concentrating means comprises a plurality of parabolic trough reflectors corresponding to said plurality of elements, each reflector fixed to said frame and arranged side-by-side with each other to form a linear array.

4. A mechanism as claimed in claim 3 wherein said parabolic trough reflectors increase in width from reflectors disposed centrally in said array to reflectors disposed towards the outside ends of said array.

5. A mechanism as claimed in claim 1 wherein said solar energy concentrating means comprises a plurality of linear Fresnel lenses corresponding to said plurality of elements.

6. A mechanism as claimed in claim 1 wherein one end of each of said elements is attached to said frame, and wherein said stretching means comprises a plurality of tension wires corresponding to said elements, each wire attached at one end to the other end of said corresponding element.

7. A mechanism as claimed in claim 6 wherein said transmitting means comprises:
   a plurality of drums corresponding to said plurality of tension wires, each drum attached to the other end of said tension wire, the drums of respective tension wires being axially connected by a common drive shaft; and
   a transfer mechanism connected to said drive shaft for transferring rotation of said drive shaft to said main collector.

8. A mechanism as claimed in claim 6 further comprising a mechanism for absorbing the slack of said tension wires.

9. A mechanism as claimed in claim 6 wherein said memorized shape is a tightly-wound coil.

10. A solar tracking mechanism for a solar collector of the type comprising a base, a frame secured to said base, and a main collector attached to said frame to be rotatable to collect radiant energy from the sun, said solar tracking mechanism comprising:
    a plurality of sensor concentrators arranged side by side and fixed to said frame with different angles respectively so as to catch the movement of the sun with time each concentrator directing received sunlight along a focal line;
    a plurality of shape memory alloy elements corresponding to said plurality of concentrators, each element having one end connected to said frame and each located at a position coincident with the focal line of the corresponding one of said sensor concentrators, said shape memory alloy elements being treated so as to shrink into a memorized shape when heated to a predetermined temperature;
    a plurality of tension wires corresponding to said elements, each wire having one end connected to the other end of said corresponding shape memory alloy element;
    a plurality of wire drums provided with a common drive shaft and each fixing the other end of each of said tension wires for winding up or winding off said tension wires; and
    a transfer mechanism operatively connected to said drive shaft for transferring rotation of said drive shaft to said main collector.

11. The solar tracking mechanism according to claim 10 wherein each of said sensor concentrators comprises a parabolic trough reflector.

12. The solar tracking mechanism according to claim 10 wherein each of said sensor concentrators comprises a linear Fresnel lens.

13. The solar tracking mechanism according to claim 10 wherein said main collector has a shape of a parabolic trough reflector.

14. The solar tracking mechanism according to claim 10 further comprising a slider mechanism including a plurality of movable pulleys each connected to one of said tension wires and relatively movable in connection with the shrinkage of said shape memory elements, and a wire having both ends fixed to said frame and engaged with all of said movable pulleys.

15. The solar tracking mechanism according to said claim 10 further comprising a mechanism for absorbing slack of each of said tension wires.

16. The solar tracking mechanism according to claim 15 wherein said slack absorbing mechanism comprises at least one movable pulley and one stationary pulley which are engaged with said tension wire.

17. The solar tracking mechanism according to said claim 15 wherein said slack absorbing mechanism comprises two stationary pulleys, a movable pulley located between said stationary pulleys, and a weight suspended from said movable pulley.

18. The solar tracking mechanism according to claim 10 wherein said plurality of sensor concentrators having widths gradually increasing from the central one towards outermost ones.

19. The solar tracking mechanism according to claim 10 wherein the outermost sensor concentrators of said plurality of sensor concentrators are disposed at large angles outwardly.

20. A mechanism as claimed in claim 10 wherein said memorized shape is a tightly wound-up coil.

* * * * *